May 31, 1955 S. M. MARCUS ET AL 2,709,361
DEVICE FOR IMPARTING ROAD VIBRATIONS TO A VEHICLE
Filed Oct. 16, 1952 3 Sheets-Sheet 1
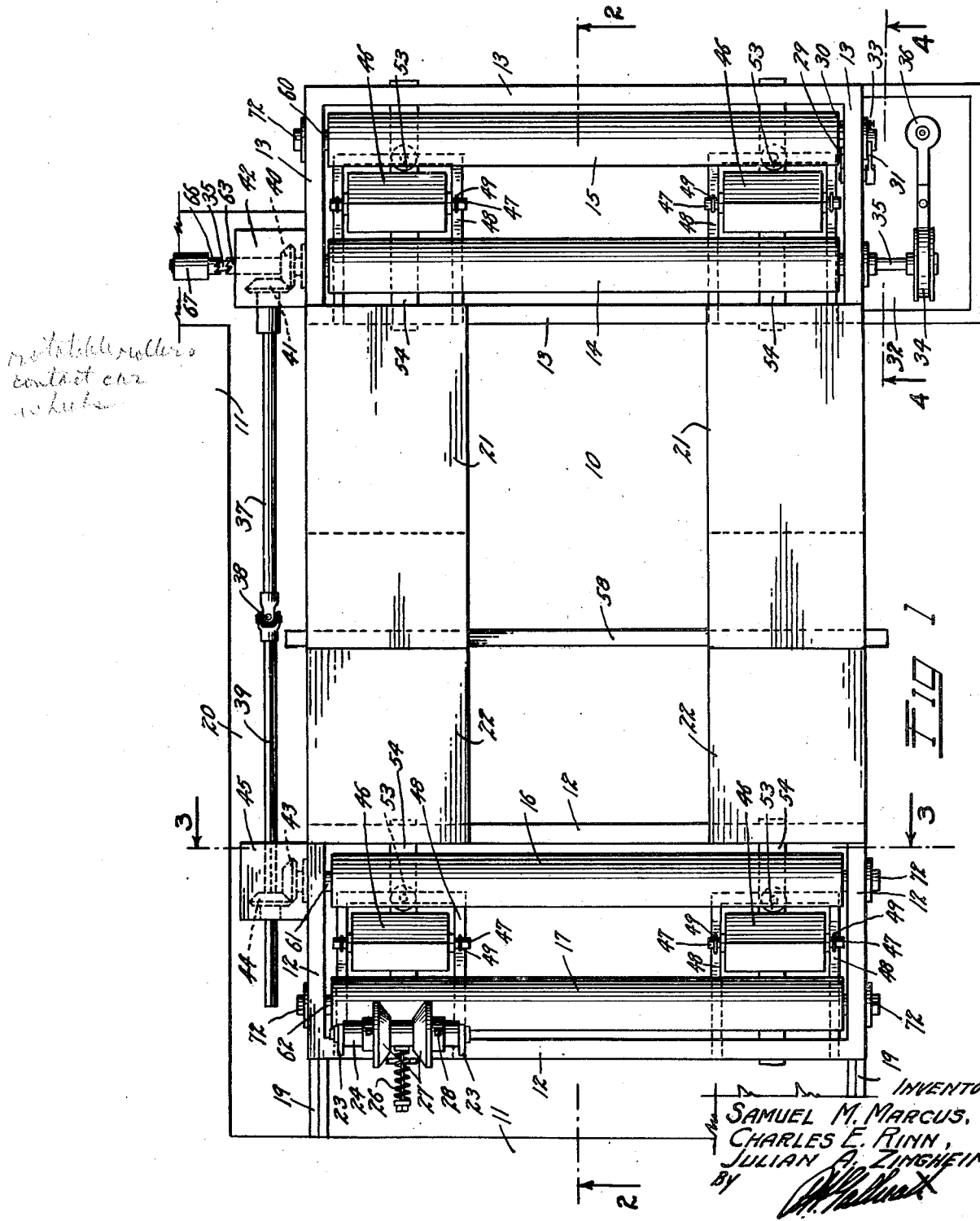
INVENTORS
SAMUEL M. MARCUS,
CHARLES E. RINN,
JULIAN A. ZINGHEIM,
BY
ATTORNEY

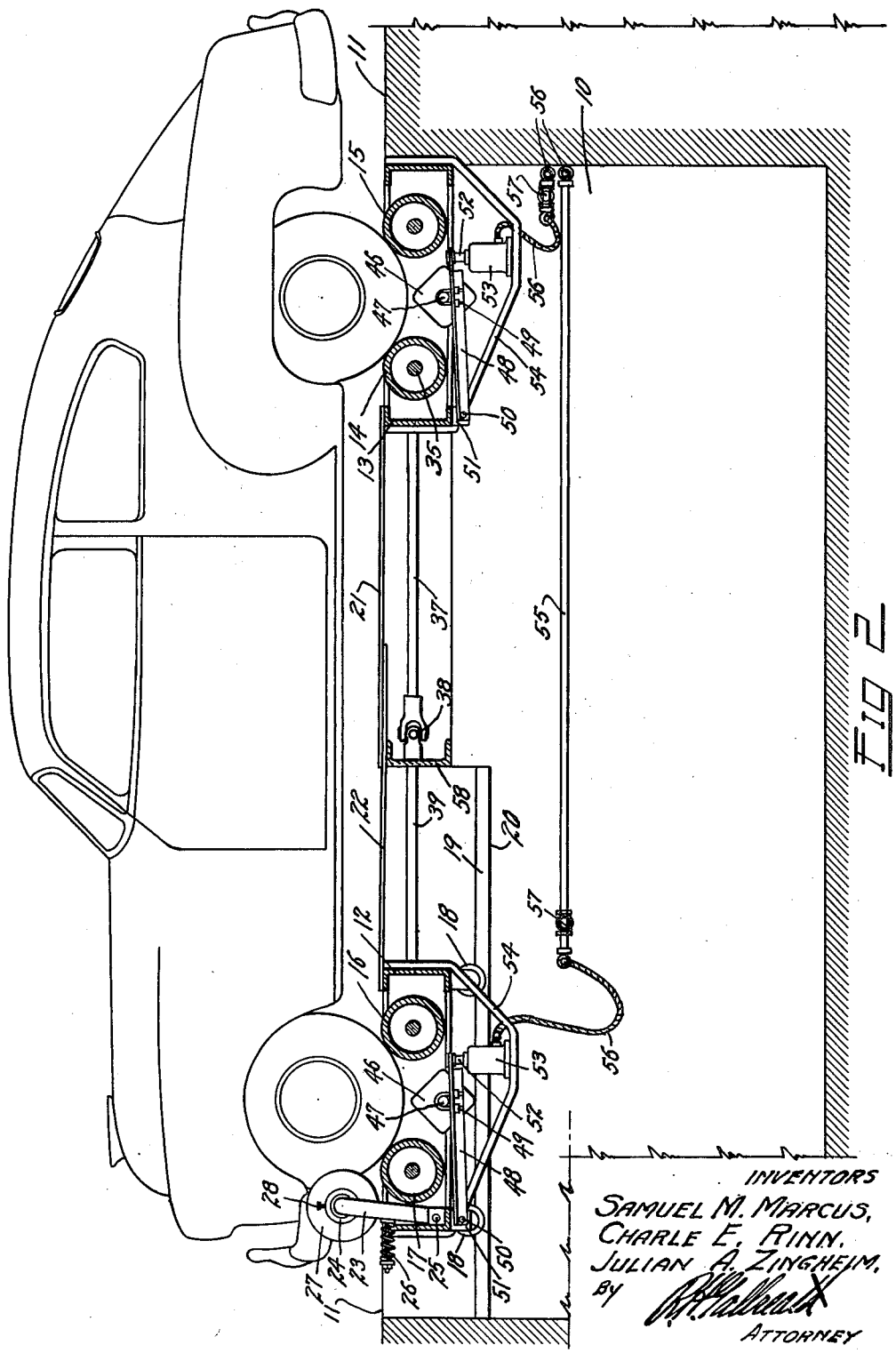

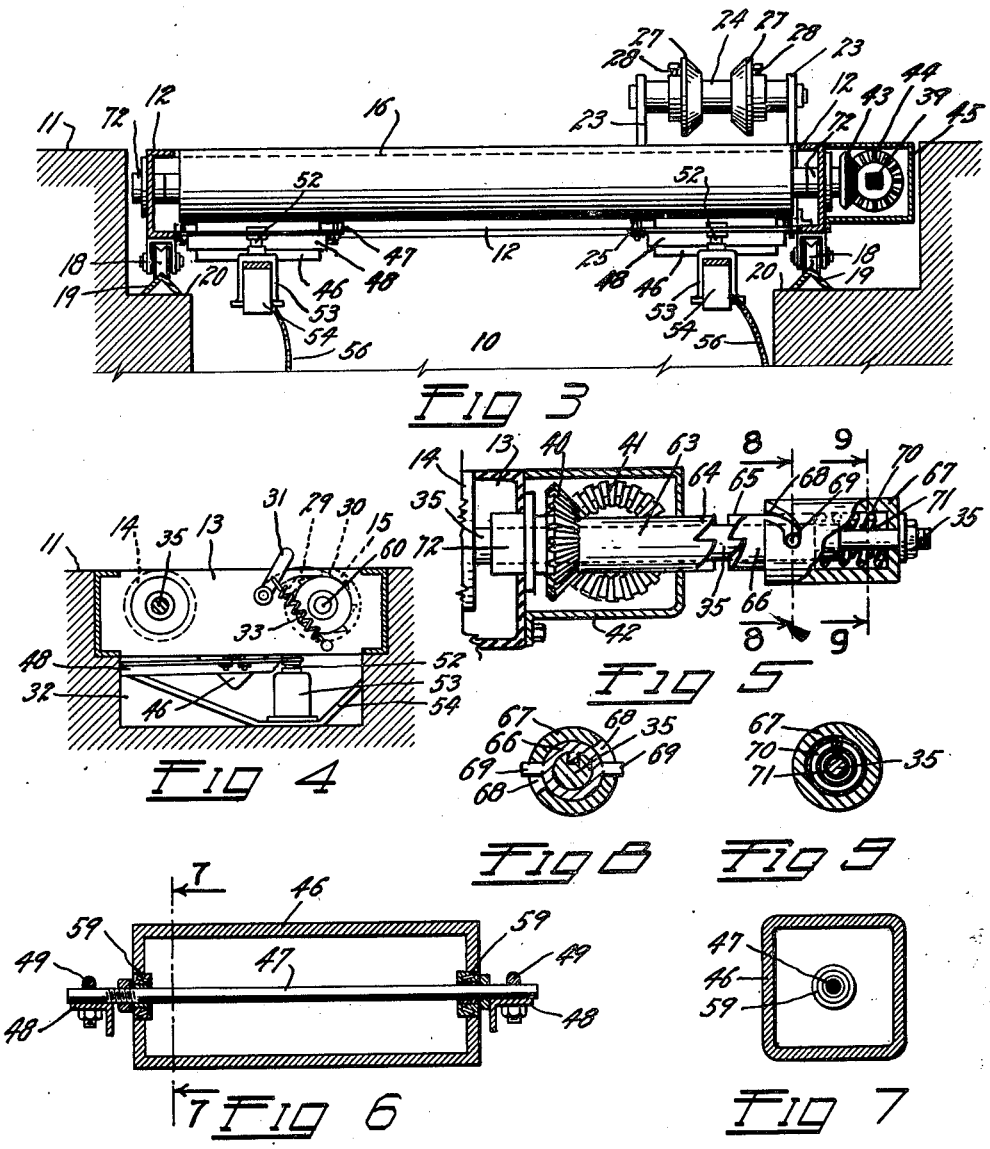

United States Patent Office 2,709,361
Patented May 31, 1955

2,709,361

DEVICE FOR IMPARTING ROAD VIBRATIONS TO A VEHICLE

Samuel M. Marcus, Charles E. Rinn, and Julian A. Zingheim, Denver, Colo., assignors to Marcus Motors, Inc., Denver, Colo., a corporation of Colorado Application October 16, 1952, Serial No. 315,076

8 Claims. (Cl. 73—72)

This invention relates to a device for checking and testing motor vehicles and has for its principal object the provision of a simple and highly-efficient device, which will be driven by the vehicle motor and which will enable the checker to simulate road vibrations in the vehicle to locate and correct the causes of rattles, squeaks, looseness and other defects in the chassis, body and engine mountings.

Another object is to so construct the device that simulated road vibrations may be selectively applied to any desired one of the four vehicle wheels or to any desired multiple or combination of the four wheels in order to assist in localizing and locating defects in the vehicle body and under carriage.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved vehicle checking and testing device;

Fig. 2 is a longitudinal section therethrough, taken on the line 2—2, Fig. 1;

Fig. 3 is a cross-section, taken on the line 3—3, Fig. 1;

Fig. 4 is a similar section, taken on the line 4—4, Fig. 1;

Fig. 5 is a detail view, partially in section, illustrating a clutch device employed in the improved testing device;

Fig. 6 is a longitudinal detail section through a non-round or square roller employed in the device;

Fig. 7 is a cross-section through the latter roller, taken on the line 7—7, Fig. 6; and Figs. 8 and 9 are detail cross-sections, taken on the lines 8—8 and 9—9, respectively, Fig. 5.

The improved testing device is preferably installed over a floor pit 10 extending below the surface of a floor 11 and comprises two horizontal, elongated, rectangular, open frames, herein designated as the front frame 12 and rear frame 13, which are supported from the sides of the pit 10 and extend transversely across the latter adjacent the front and rear extremities thereof.

The rear frame 13 rotatably supports an elongated driven roller 14 and a similar elongated idler roller 15 in parallel relation. The rollers 14 and 15 are carried on axis shafts 35 and 60, respectively, rotatably mounted in suitable anti-friction bearings 72 in the end members of the frame 13.

The front frame 12 similarly supports two parallel rollers, that is, a drive roller 16 and an idler roller 17 mounted on axis shafts 61 and 62, respectively. The rollers of each frame are spaced apart sufficiently so that the opposite wheels of a vehicle, such as illustrated in Fig. 2, will be supported between the rollers of each pair. The rollers have sufficient length to exceed the standard wheel tread width of conventional vehicles.

In order to accommodate vehicles of various wheel bases, the front frame 12 is mounted on suitable track wheels 18 which ride upon supporting tracks 19, carried on indented shoulders 20 in the walls of the pit 10, and allow the front frame 12 to move freely forward and back.

Two bridging plates 22 are secured to and extend rearwardly from the front frame 12. Two similar bridging plates 21 are secured to and extend forwardly from the rear frame 13 in overlapping relation with the plates 22. The overlapped plates may be supported over the pit 10 in any desired manner, such as by means of a cross-beam 58.

The front frame 12 carries a spring-cushioned, hinged bracket arm 23 which rotatably supports a guide roller spool 24. The bracket arm is hinged at 25 to the frame 12, and its forward movement is cushioned by means of a shock absorbing spring 26. Two side flange members 27 are adjustably mounted on the spool 24 and may be set in any desired separated relation on the spool 24, by means of suitable set screws 28, to receive the tread of one of the front wheels of the vehicle being tested, between them.

The automobile or other vehicle to be tested is driven longitudinally onto the device. The front wheels travel across the two rear rollers 14 and 15 and onto the plates 21, gripping the plates 22 therebelow, and drop into position between the rollers 16 and 17. If the rear wheels have not as yet reached a position between the rollers 14 and 15, the entire frame 12 will be forced forwardly by the forward movement of the vehicle until the rear wheels drop between the two rear rollers 14 and 15, as shown in Fig. 2. Therefore, it can be seen that the device automatically adjusts itself to the wheel base of the vehicle to be tested.

When the vehicle reaches its final position, one of the front wheels will enter between the two side flange members 27 to maintain the front wheels in parallel, axial alignment and prevent lateral movement of the vehicle.

When it is desired to remove the vehicle from the device, a ratchet dog 29 is engaged in the teeth of a ratchet gear 30 formed or secured on the extremities of the idler roller 15 to prevent the latter roller from rotating forwardly as the rear wheels rotate rearwardly. This provides traction so that the vehicle may be backed from the device onto the floor 11. As the vehicle moves rearwardly, the front frame also moves rearwardly until stopped by the beam 58. The front wheels are then drawn from between the rollers 16 and 17 by the rearward movement of the vehicle and the front frame is in position to receive the front wheels of the subsequent vehicle.

The ratchet dog 29 is swung to and from its engaged position by means of an actuating lever 31 located in a control pit 32 at one side of the frame 13. The dog is held in either the engaged or disengaged position by means of a past-dead-center spring 33.

For testing the delivered horse power of the vehicle, a Prony brake 34 may be mounted on the axis shaft 35 of the driven roller 14. The Prony brake 34 actuates a conventional fluid pressure dynamometer 36.

All of the wheels of the vehicle can be caused to rotate in unison by means of a connecting shaft 37, a universal joint 38, and a universal shaft 39. The shaft 37 is driven from the axis shaft 35 of the driven roller 14 through the medium of a set of miter gears 40 and 41 positioned in a gear housing 42 at one extremity of the frame 13.

The universal shaft 39 is slidable through the hub of a third miter gear 43 which meshes with a fourth miter gear 44 on the axis shaft 61 of the roller 16. The gears 43 and 44 are enclosed in a second gear housing 45 mounted on one extremity of the frame 12. The gear 43 is either splined upon the universal shaft, or the latter is formed from square shafting, so that the gear 43 is free to move longitudinally of the shaft 39 to accommodate the longitudinal movements of the frame 12, yet must rotate with the shaft to transmit power to the gear 43.

It can be seen that if the rear wheels of the vehicle are rotating forwardly under the power of the vehicle motor, they will drive the rollers 14 and 15 rearwardly. The roller 14 will in turn transmit rotation through the miter gears 40 and 41, the shafts 37 and 39 and the gears 43 and 44 to the roller 16.

The friction of the front wheel tires on the rotating roller 16 causes the front wheels to rotate, and in turn rotate the idler roller 17 so that all of the vehicle wheels, and all of the rollers, rotate similarly and simultaneously as they would under actual road conditions. A mechanic positioned in the pit 10 can observe and hear the actions of the transmission, differential, propeller shaft, and wheels at various road speeds to determine any inaccuracies or misfunctions therein.

The device is also designed so that impacts similar to those produced by rough road conditions may be applied to any or all of the vehicle wheels to test the action of the chassis, springs, shock absorbers, shackles, etc., under the influence of various road conditions to determine any fractures or breaks and to locate squeaks, looseness, and rattles in the undercarriage or chassis of the vehicle. This is accomplished by means of what might be termed "bouncer" rollers 46. The latter rollers are preferably rectangular in cross-section, as shown in Fig. 7, and are free to rotate in anti-friction bearings 59 on stationary roller shafts 47.

Each roller shaft 47 extends transversely of a hinged roller frame 48 to which it is secured in any desired manner, such as by means of suitable U-bolts 49. Each roller frame 48 is U-shaped, with its two extremities mounted on hinge pins 50 carried in hinge brackets 51 beneath the forward member of each frame 12 and 13. The rear extremity of each of the four roller frames 48 is supported upon a hydraulic plunger 52 extending from a hydraulic cylinder 53 carried in a suitable supporting sling 54 below its respective frame 12 or 13. The cylinders are connected to any desired source of fluid pressure through the medium of pressure conduits 55 and hydraulic hoses 56. The conduit to each cylinder is individually controlled by means of a suitable two-way valve 57.

It can be seen that if fluid pressure is applied to any of the four hydraulic cylinders 53, the bouncer roller 46 supported by the plunger of that cylinder will be forced upwardly against the bottom of the tire tread of the wheel over that roller. The rectangular bouncer roller will be rotated by friction with the rotating tire tread, and the eccentric periphery of the bouncer roller will impart a vertical pounding vibration to the wheel thereover. The intensity of the vibration will depend upon the height of the bouncer roller and the latter can be minutely adjusted by varying the supply of fluid to the respective hydraulic cylinder.

Therefore, any desired vibratory road condition can be simulated and applied to any or all of the wheels so that looseness, squeaks, rattles, fractures, etc., can be quickly and easily located and repaired.

If it is not desired to rotate the front wheels, such as when a power or dynamometer test is being made, the connecting shaft 37 may be disconnected by means of the clutch structure illustrated in detail in Fig. 5. In the clutch structure, the miter gear 40 is formed integrally with a hub sleeve 63 and the axis shaft 35 is free to rotate within the gear 40 and its sleeve 63. The outer extremity of the sleeve 63 terminates in clutch teeth 64 positioned to be engaged by similar teeth 65 on a sliding clutch spool 66. The clutch spool 66 is splined upon the shaft 35 so as to rotate therewith and is slidable along the shaft so that the teeth 64 and 65 may be brought into engagement to transmit rotation to the gear 40.

A cup-shaped barrel 67 is rotatably mounted on the extremity of the shaft 35 and surrounds the spool 66. The barrel is provided with hooked slots 68 which can be brought into engagement with projecting pins 69 on the spool to hold the latter out of engagement with the hub sleeve so that the shaft 35 and the spool 66 may rotate without driving the gear 40 and, of course, without driving the front wheels of the vehicle. An outer spring 70 constantly urges the spool 66 toward the hub sleeve 63 and a second inner spring 71 constantly urges the barrel outwardly toward the end of the shaft 35 to withdraw the spool from engagement when the latter is attached to the barrel by the slots 68 and the pins 69. Thus, it can be seen that the front wheels may be connected or disconnected at will.

It is desired to call attention to the fact that the barrel 67 of the clutch rotates with the shaft 35, regardless of whether the teeth 64 and 65 are in engagement or not. Therefore, it is impossible to grip and rotate the barrel so as to engage or disengage the clutch while the rear wheels of the car are rotating. Therefore, sudden, accidental starting or stopping of the front wheel unit, with possible injurious results, is eliminated.

It is also desired to call attention to the fact that the bouncer rollers in the front frame differ slightly (say one-half inch) in their diagonal transverse measurement or size from the bouncer rollers in the rear frame. This is a necessary precaution, since, were all the bouncer rollers exactly the same size, they could synchronize or "get in step" with each other so as to build up an accelerating bounce of the entire vehicle, which might throw it from the device. A variation in the bouncer roller size prevents the vibration cycles of the rollers from synchronizing.

It is also desired to call attention to the fact that when a vehicle leaves the device, the front bridging plates 22 will be drawn back beneath the rear bridging plates 21 so as to be completely covered by the latter. Therefore, when a vehicle is driven onto the device, the weight of the front wheels on the plates 21 presses the latter downwardly onto the plates 22 so as to securely lock the front frame from movement until the front wheels leave the plates 21 and drop into place in the front frame. As the vehicle leaves the device, the front plates 22 move back beneath the rear plates 21 before the front wheels move rearwardly onto the latter. Thus, in ordinary use the front wheels never travel on the plates 22.

This device is ideal for use with visual screen caster and camber testing devices, since the front wheels can be tested for correct geometric steering angles while rotating under actual road conditions.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. An automotive vehicle testing and checking device comprising: a fixed roller-supporting frame; a pair of parallel, rotatably-mounted, cylindrical rollers mounted on said frame and spaced apart sufficiently to receive and support a wheel of said vehicle; a vertically movable roller support; an eccentric roller rotatably mounted in said roller support between said cylindrical rollers; and means for elevating said roller support so as to bring said eccentric roller into contact with a rotating vehicle wheel supported on said cylindrical rollers.

2. An automotive vehicle testing and checking device as described in claim 1 in which said roller support comprises a tiltable frame rotatably supporting, adjacent its one extremity, said eccentric roller and hinge means securing the other extremity of said tiltable frame to said fixed frame on a horizontal axis, said elevating means acting to swing said tiltable frame vertically about said hinge means to bring said eccentric roller into contact with a vehicle wheel supported on said cylindrical rollers.

3. An automotive vehicle testing and checking device as described in claim 2 in which the elevating means comprises a fluid-expansible device connected to said tiltable frame; and having means for supporting said fluid-expansible device from said fixed frame so that expansion of said device will tilt said tiltable frame.

4. An automotive vehicle testing and checking device as defined in claim 1, in which said cylindrical rollers are sufficiently long to receive and support two opposite wheels of said vehicle, there being a separate eccentric roller and elevating means therefor positioned beneath the position of each of said opposed wheels, so that either desired eccentric roller may be raised into contact with its respective wheel.

5. An automotive vehicle testing and checking device comprising: a rear horizontal frame; a pair of rotatably mounted, parallel, cylindrical rear rollers mounted in said rear frame and spaced apart to receive and support the rear wheels of a vehicle; a front horizontal frame; a second pair of similar front rollers rotatably mounted in said front frame and spaced apart to receive and support the front wheels of said vehicle; means transmitting power from said rear rollers to said front rollers; a vertically movable eccentric roller rotatably mounted between the cylindrical rollers of each pair and beneath each wheel position thereon; and means for elevating said eccentric rollers into contact with the rotating wheels positioned thereover when desired.

6. An automotive vehicle testing and checking device comprising: a rear horizontal frame; a pair of rotatably mounted, parallel, cylindrical rear rollers mounted in said rear frame and spaced apart to receive and support the rear wheels of a vehicle; a front horizontal frame; a second pair of similar front rollers rotatably mounted in said front frame and spaced apart to receive and support the front wheels of said vehicle; means transmitting power from said rear rollers to said front rollers; a vertically movable eccentric roller rotatably mounted between the cylindrical rollers of each pair and beneath each wheel position thereon; and means for independently elevating any desired one of said eccentric rollers.

7. An automotive vehicle testing and checking device comprising: a roller supporting frame; a pair of parallel rotatably-mounted, spaced-apart cylindrical rollers mounted in said frame, said rollers being sufficiently long to receive and rotatively support two opposite wheels of a vehicle; a vertically movable roller support positioned beneath the position of each of said opposite wheels; an eccentric roller rotatably mounted in each roller support and positioned between said cylindrical rollers; and means for independently elevating either of said roller supports so as to bring its respective eccentric roller into contact with a rotating vehicle wheel supported thereabove on said cylindrical rollers.

8. An automobile vehicle-testing device comprising: a pair of rotatable rollers spaced apart to receive the wheel of a vehicle therebetween; a supporting frame supporting said rollers; a hinged frame hinged to said supporting frame and extending beneath said rollers; a roller shaft supported by said hinged frame; an eccentric roller rotatably mounted on said roller shaft and positioned between said rollers; and means acting to swing said roller frame upwardly to bring said eccentric roller into contact with the tire of said wheel.

References Cited in the file of this patent

UNITED STATES PATENTS

| 1,464,763 | Isenberg | Aug. 14, 1923 |
| 1,511,818 | Moore | Oct. 14, 1924 |
| 1,652,225 | Wasson | Dec. 13, 1927 |
| 1,804,041 | Tilden | May 5, 1931 |
| 1,982,041 | Anderson et al. | Nov. 27, 1934 |
| 2,463,377 | Grant | Mar. 1, 1949 |

FOREIGN PATENTS

| 273,742 | Great Britain | Nov. 3, 1927 |